(12) United States Patent
Bestgen et al.

(10) Patent No.: US 6,754,652 B2
(45) Date of Patent: Jun. 22, 2004

(54) DATABASE QUERY OPTIMIZER FRAMEWORK WITH DYNAMIC STRATEGY DISPATCH

(75) Inventors: Robert Joseph Bestgen, Dodge Center, MN (US); Curtis Boger, Oronoco, MN (US); John David Dietel, Rochester, MN (US); Robert Victor Downer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 10/113,174

(22) Filed: Mar. 29, 2002

(65) Prior Publication Data

US 2003/0187831 A1 Oct. 2, 2003

(51) Int. Cl.⁷ ............................................... G06F 17/30
(52) U.S. Cl. ................................................ 707/3; 707/4
(58) Field of Search ............................... 707/1, 2, 3, 4, 707/5, 6, 7, 8, 9, 10, 101, 102

(56) References Cited

U.S. PATENT DOCUMENTS 5,826,077 A * 10/1998 Blakeley et al. ............... 707/4
6,567,802 B1 * 5/2003 Popa et al. .................... 707/3
6,598,044 B1 * 7/2003 Waas et al. .................... 707/3

OTHER PUBLICATIONS

Aberer, Karl et al, "Rule Based Generation of Logical Query Plans With Controlled Complexity", Deductive and Object-Oriented Databases, 1997, pp. 399–416.

Aberer, Karl et al, "Semantic Query Optimization for Methods in Object–Oriented Database Systems", German National Research Center for Computer Science, GMD Technical Report No. 849, Jun. 1994, pp. 1–22.

Pellenkoft, Arjan et al, "Duplicate–Free Generation of Alternatives in Transformation–Based Optimizers", Proceedings of the Fifth International Conference on Database Systems for Advanced Applications, Australia, April 1997.

Graefe, Goetz et al, "The Volcano Optimizer Generator: Extensibility and Efficient Search", Proceedings of the IEEE Conference on Data Eng., Vienna, Austria, April 1993, pp. 209–218.

* cited by examiner

Primary Examiner—Diane D. Mizrahi
Assistant Examiner—Yicun Wu
(74) Attorney, Agent, or Firm—Wood, Herron & Evans, LLP

(57) ABSTRACT

An apparatus, program product and method utilize a query optimizer that relies upon a plurality of dynamically-dispatchable active strategy entities to generate an optimized execution plan for a database query. The plurality of active strategy entities form a optimizer framework from which the knowledge available to the optimizer, and the intelligence utilized by the optimizer in generating execution plans, may be represented in a structured, flexible, extensible and easily-modifiable manner.

21 Claims, 5 Drawing Sheets

DATABASE QUERY OPTIMIZER FRAMEWORK WITH DYNAMIC STRATEGY DISPATCH

FIELD OF THE INVENTION

The invention relates to database management systems, and in particular, to database query optimizers utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan." Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan. Some optimizer designs are referred to as "rule-based" optimizers. Rule-based optimizers implement optimization algorithms in terms of rules that define specific operations that need to occur when certain conditions are met. Such rules are defined statically and are hard coded into the optimizers.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Since interesting queries are generally long, complex, and involve many relational tables, optimizers typically break many queries into steps. Conventional optimizers typically generate alternative plans for each step, compute their respective estimated costs, and then incrementally combine the estimated costs for the various steps for comparison against other competing plans or portions thereof. Because of the large search space mentioned above, early elimination of entire quadrants of the search space is often necessary. In addition, the generation of alternative plans, and the subsequent discarding of such plans as a result of comparisons made with other plans, must be performed quickly and without disrupting the original state of a query.

In this regard, one way to view a query optimizer is that of a query execution "simulator", since in order to do a cost estimate of an access plan for any part of a query (or the entire query), an optimizer must simulate the environmental conditions under which the query will eventually be executed.

The optimization algorithms utilized by conventional query optimizers are continually improved, and new query optimization algorithms are devised every day. However, optimization algorithms and techniques do not operate in a vacuum, and the design of an optimizer often must take into account the various performance characteristics of various algorithms and techniques utilized therein. Conventional optimizers are typically developed with a given set of techniques and optimizations in mind, and as a result, it is very difficult to modify or add mechanisms to an optimizer design to improve the performance of the design vis a vis one particular query form, without inadvertently introducing regression in the performance of other query forms.

Put another way, the implementation of conventional optimizers is often too closely coupled with the assumptions of the various algorithms they use, i.e., the knowledge available to an optimizer, and the intelligence embodied in an optimizer that utilizes such knowledge, is often unavoidably intertwined in the logic of the optimizer. As an example, the decision making implemented within conventional optimizers is often very specific, and is "hard coded" to try various optimization algorithms in specific orders. Even in rule-based optimizers, rules are inflexibly defined and intertwined with the hard logic of the optimizer. As a result, in many instances particular optimization algorithms are inherently favored over other algorithms.

Given the continual development and refinement of optimization algorithms and techniques, modifying the operation of a particular optimizer design to incorporate new or refined optimization functionality is often desirable. However, due to the static and inflexible manner in which many optimizer designs are coded, such modifications are often difficult, costly and time consuming. A need therefore exists for a more flexible and extensible optimizer architecture that is better suited to incorporating new or improved optimization algorithms and techniques.

SUMMARY OF THE INVENTION

The invention addresses these and other problems associated with the prior art by providing an apparatus, program product and method in which a query optimizer utilizes a plurality of dynamically-dispatchable active strategy entities to generate an optimized execution plan for a database query. The plurality of active strategy entities form a optimizer framework from which the knowledge available to the optimizer, and the intelligence utilized by the optimizer in generating execution plans, may be represented in a structured, flexible, extensible and easily-modifiable manner.

Consistent with the invention, a plurality of active strategy entities including at least (but not limited to) first, second and third active strategy entities are utilized by a query optimizer to generate an optimized execution plan for a database query. The first and second active strategy entities may each be configured to generate at least a portion of an execution plan. The third active strategy entity may be configured to dynamically evaluate at least one condition associated therewith, and in response thereto, to dynamically dispatch at least one of the first and second active strategy entities. Generation of the optimized execution plan for a database query may be initiated by dynamically dispatching the third active strategy entity.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize a unique optimizer framework to support the dynamic dispatch of active entities, referred to herein as strategies, that cooperatively implement the query optimization functionality of a database management system. Strategies may be implemented using various programming models, both object-oriented and non-object-oriented in nature. In the embodiments discussed hereinafter, strategies are implemented as objects that are "active" in nature to the extent that such objects, once invoked, are capable of dispatching, or initiating the execution of, other strategy objects in connection with the optimization of a database query. As will become more apparent below, such strategies may be formulated in such a manner that the collective "intelligence" of an optimizer may be represented in a structured, flexible, extensible and easily-modified manner, and such that such intelligence may be tailored, optimized, or otherwise modified without requiring substantial modification of the hard coded aspects of an optimizer.

A specific implementation of an optimizer framework capable of supporting dynamic strategy dispatch in a manner consistent with the invention will be discussed in greater detail below. However, prior to a discussion of such a specific implementation, a brief discussion will be provided regarding an exemplary hardware and software environment within which such an optimizer framework may reside.

Hardware/Software Environment

Figure 1:
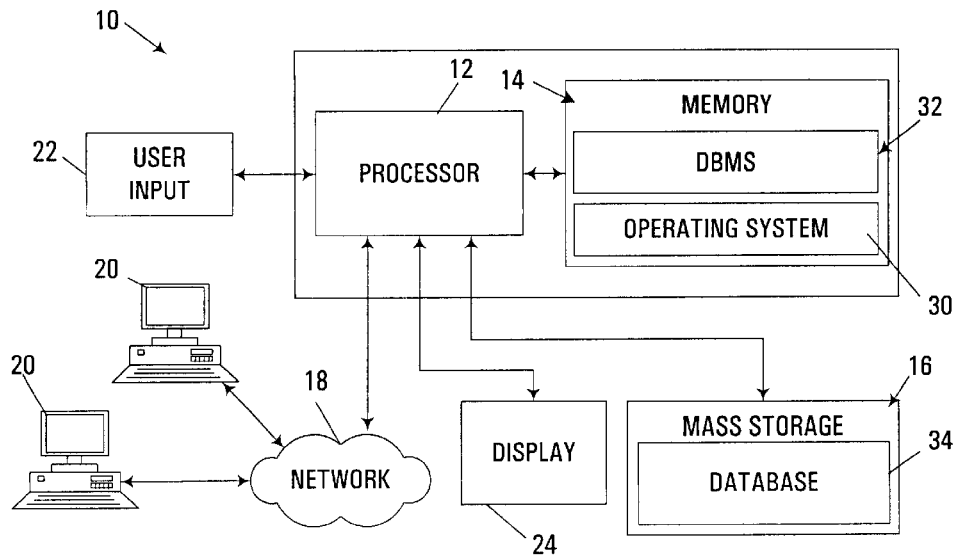
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating dynamic strategy dispatch consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
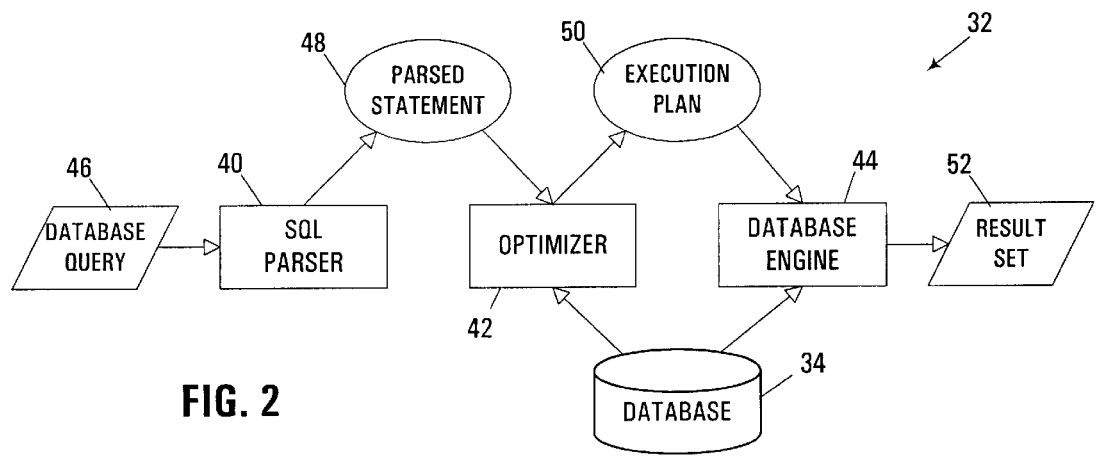
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Optimizer Framework Overview

The embodiments discussed herein utilize an optimizer framework to represent the optimization functionality of an optimizer, in effect substituting active objects or entities for the hard coded algorithms conventionally incorporated into existing query optimizers. By doing so, such an optimizer framework may be configured if desired to not give any particular optimization technique or algorithm is over its competitors. Put another way, the herein-described optimizer framework may be configured (if desired) to be free of explicit or implicit bias toward certain algorithms (e.g., nested loop versus hash join) or optimization techniques (e.g., Greedy join enumeration).

As will become more apparent from the discussion below, an optimizer framework consistent with the invention represents optimizer functionality in terms of a collection of active strategy entities or objects, which, among other advantages, permits the "intelligence" of an optimizer to be represented separately from its "knowledge." By separately representing intelligence and knowledge, significant flexibility is afforded in designing, developing and dynamically modifying either aspect of an optimizer design.

Knowledge and Intelligence

Figure 3:
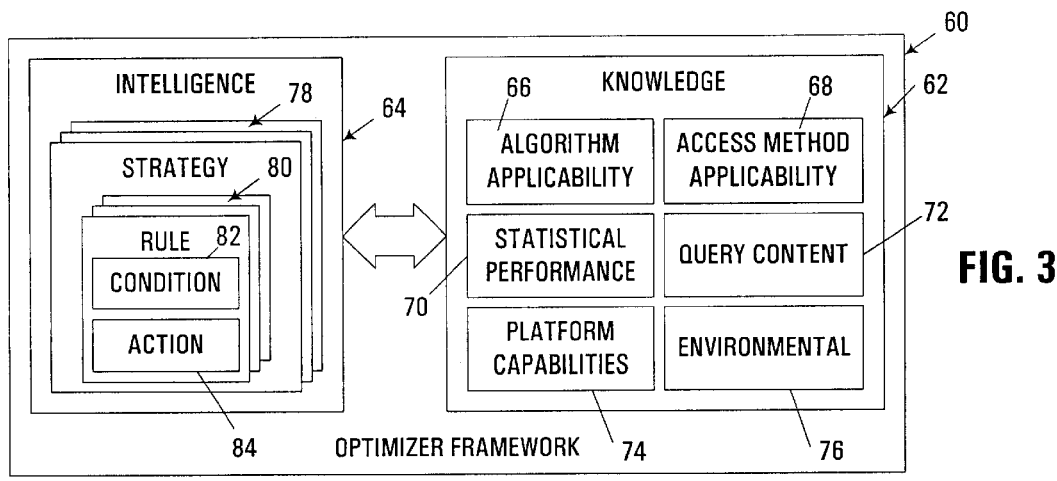
FIG. 3 is a block diagram of an optimizer framework utilized by the optimizer component of the database management system of FIG. 2.

As shown, for example, in FIG. 3, an exemplary optimizer framework 60 may include both the knowledge available to the optimizer, represented at 62, and the intelligence, represented at 64, that the optimizer utilizes to optimize queries based upon the knowledge made available thereto.

The knowledge relied upon by an optimizer can include practically any information that is relevant to which optimization algorithms should be performed and/or how to implement such optimization algorithms, including information such as the set of truths about a query, the available choices for access for access methods, machine capacities, and the state of queried files, etc., that the optimizer has access to at any point. Knowledge may incorporate known facts as well as inferred information such as cost estimates and column relationships (RI) that are relevant for optimization. In certain instances, such information may not be scalar in nature, and discovering such information may involve a significant amount of complex calculation or lookup. Furthermore, in many instances some numerical information is probabilistic in nature, having statistical distribution functions associated therewith.

FIG. 3 illustrates a number of principal classes of information that may be represented in the knowledge embedded in an optimizer framework. However it should be appreciated that other types of information may also be utilized by an optimizer consistent with the invention.

One type of knowledge that may be utilized by an optimizer is algorithm applicability information 66, which is associated with the applicability of particular optimization algorithms to different scenarios. Such information may identify the different query execution object forms that could be built by the optimizer to accomplish what was specified in part of a query, as well as information regarding the appropriate usages of such forms for optimum efficiency.

For example, the "nested loop" algorithm is classified as a join algorithm, while the "hash grouping" algorithm is a grouping algorithm, and the "sorting" algorithm is an ordering algorithm. Each algorithm is utilized for different purposes, and is most efficient under certain circumstances. As such, it is beneficial to incorporate information regarding the applicability of each such algorithm into the knowledge available to an optimizer framework.

Another type of knowledge that may be utilized by an optimizer is access method applicability information 68, which is associated with the applicability of particular access methods to different scenarios. Some access methods are inherent in a database management system (e.g., a table scan in a relational database), while some are usually dynamically discovered or determined (e.g., an index probe, which requires knowledge of what indexes exist and how such indexes can be used). In the embodiments discussed herein each assignment of an access method may take place in a low-level strategy object where the knowledge of those methods may reside. Further, it is often desirable for access methods to be represented generically so that they can be used interchangeably until their actual definition is required at query execution time.

As will be described in greater detail hereinafter, each possible implementation algorithm and access method may be represented by one or more active strategy entities that are capable of implementing the algorithm/access method and determining when and how to apply the algorithm/access method. In the example embodiment below, separate strategies are used to implement and determine the applicability of a particular algorithm or access method. However, in other embodiments, a single strategy may be utilized to implement both functions, with such a strategy configured to respond to queries about its attributes and applicability in a standardized manner.

Additional types of information that may be incorporated into the knowledge of an optimizer framework include information such as statistical performance information 70, query content information 72, platform capabilities information 74 and environmental information 76. Statistical performance information refers to metadata, which typically represents statistics or other metrics about the values actually stored in the tables being queried. Query content information refers to the query graph, expressions, parameters, and reference variable values associated with a particular query. Platform capabilities information refers to information such as processor capabilities, memory/storage capabilities, networking capabilities, which may be relevant to an optimization, e.g., if particular resources are constrained, or if certain algorithms operate more efficiently on certain platforms. Environmental information refers to information such as process/thread restrictions and user-specified artificial constraints.

It will be appreciated that a wide variety of types of information has and can be utilized in connection with various query optimizer designs, and that any of such information may be incorporated into the knowledge of an optimizer framework consistent with the invention. As such, the invention should not be limited to the particular implementations discussed herein.

From the perspective of intelligence, it will be appreciated that, in the context of query optimization, an optimizer framework consistent with the invention should provide for decision-making capabilities in a number of contexts, including:

choosing general strategies to use in searching for a solution, and in what order;

determining which query transformations (another way of viewing the search space) to consider and attempt for portions of a query (e.g., subgraphs or nodes of a query), and in what order;

determining which specific access methods to assign to sub graphs or nodes of a query;

determining which of multiple completed access plans is superior;

determining when to abandon a strategy as unfruitful;
determining when to complete an optimization (i.e., a completion criterion, or when a plan been found that is "good enough".

An optimizer framework consistent with the invention may also provide a mechanism to explain the steps of logic taken, and the reasons for those steps. It will be appreciated that when analyzing the plans produced by conventional optimizers, it is often difficult or impossible to determine why an optimizer chose what it did, even though it is clear what was done. This leaves the analyst somewhat at a loss to influence the optimizer to make a different decision, since the reasoning cannot be explained. With a framework that incorporates a mechanism to explain what steps of logic were taken during optimization, an analyst would be able to get answers to these why questions, thus providing insight into what might influence the optimizer to make different choices in the future, and how to improve the overall design of the optimizer. For example, each strategy may be configured to, when requested, describe the criteria for which it is checking the choices it makes, and why they were made, into a common trace buffer.

To provide the aforementioned functions, the intelligence 64 of optimizer framework 60 incorporates a plurality of active strategy entities, or strategies 78. Such entities are designed to make decisions with an ever-changing set of truths (knowledge). In the herein-described framework, such entities are capable of being dynamically dispatched, or executed, either by hard coded optimizer logic or by other strategy entities. Such dispatch may occur in a number of manners. For example, where objects are utilized to represent strategies, dynamic dispatch may occur either through invoking a method on an existing strategy object, or through instantiation of a new strategy object of a particular class. In other programming environments, other appropriate manners of dynamically dispatching a strategy may be used. For example, in a procedural programming environment, an array or queue of procedure or program pointers may be used, with entries being dynamically added, removed or executed as optimization proceeds.

Through the representation of optimizer intelligence in strategies, the resulting optimizer has substantially greater flexibility and extensibility due to the ability to dynamically modify the optimizer's repertoire of strategy, implementation algorithm, and/or query transformations in an independent and straightforward fashion. Coupling this flexibility with the ability to often modify the knowledge available to the optimizer, a developer is given significant flexibility in improving the performance of an optimizer, either in general or in a specific operational environment.

The representation of intelligence via structured strategy entities is in contrast to conventional optimizers, where intelligence is generally not separately represented or applied; it is a side-effect of the way the code is put together (e.g., try algorithm A, then algorithm B, then algorithm C, then stop). Conventional optimizer logic is often simple, crude, and hard-coded, and therefore difficult to modify (improve). Knowledge is gleaned by looping through arrays or knowing what bit to check under which circumstances. As a consequence, adding a new algorithm or implementation method in a conventional optimizer often causes a rippling of code changes throughout the optimizer as the new algorithm's personality spreads and intertwines with that of others. This is extremely inflexible; and often prevents the simple addition of new optimizer strategies because the code is the strategy.

It will be appreciated by one of ordinary skill in the art having the benefit of the instant disclosure that, while FIG. 3 illustrates knowledge and intelligence as being separate in optimizer framework 62, such illustration should not be interpreted to mean that all knowledge is stored outside of the strategy entities forming the intelligence of the framework. Where knowledge is actually stored can vary in different embodiments. For example, the rules implemented within strategies, as described below, may effectively store some optimizer knowledge. As an example, a rule defined in one strategy that determines whether to dispatch another strategy to perform a specific optimization algorithm incorporates a condition that inherently incorporates knowledge about the applicability of the algorithm. As such, a strategy or rule may contribute to both the intelligence and knowledge of the optimizer framework. However, given the structured manner in which such entities are represented, the intelligence and knowledge embodied by such entities is typically modifiable in a manner that is substantially easier than is provided by conventional hard coded optimizer designs.

Also, the actual query being optimized represents a portion of the knowledge, as does data in the database that will ultimately be queried. As such, FIG. 3 should not be interpreted to suggest the inclusion of any particular data structure or repository architecture for storing all of the knowledge embodied in an optimizer framework.

It should also be appreciated that, while much of the functionality in an optimizer framework is embodied in interrelated strategies that operate in a cooperative manner to perform query optimization, other program code, either incorporated into strategies or otherwise resident in an optimizer, may contribute to the overall operation of an optimizer consistent with the invention.

Rules, Conditions, and Actions

Conventional optimizers are full of rules, most of which are the "of thumb" kind that seasoned query veterans have developed over the years. When coded directly into a software system, such rules eventually form a hodgepodge of complicated conditional statements combined with magical numbers (fudge factors) and sudden jumps out of a mainline path of code. Intelligence is thus represented in a relatively manner that is relatively incomprehensible to anyone other than the actual developers.

In contrast, the herein-described optimization framework attempts to formalize intelligence through the use of rules, conditions and actions defined within the active strategy entities that make up the intelligence of the optimizer framework.

As shown in FIG. 3, in the illustrated embodiments, strategies may incorporate one or more rules 80, each of which incorporating a condition 82 to check for truth and an action 84 to perform when that condition is found to be true. Both conditions and actions may be compounded, i.e., made up of other conditions and actions. A condition may incorporate multiple "tests", and practically any combination of logic that may be used to condition the performance of an action. Likewise, an action may take a number of forms, including the dispatch of other strategies, the execution of program code in the same strategy entity, a different strategy entity, or in other program code, execution of an optimization algorithm, selection of an access method, generation of an access plan, assignment of an access plan to a node, optimization of a strategy or rule, the decision of whether to abandon a strategy or complete the optimization, or practically any other operations that may be useful in connection with optimizing queries and/or improving the operation of an optimizer.

A rule may also provide an applicability score, suitable for use by a strategy to choose the next rule to be executed from among those that may be applicable at any point in time. The better the score, the more benefit the performance of that rule's actions may have on the optimization currently in progress. Part of the applicability score may also be a measure of how long it will take to execute the rule's action, so that the cost of doing something can be accounted for as well.

The general form of a rule is:

IF <condition> THEN perform <action> where a <condition> is an abstract entity that can be tested for its truth value. Examples of tests that might appear as conditions are: check for environmental condition, count join files, compare costs, check the state of part of the query, check a query parameter value, etc.

In the illustrated embodiments, a strategy may be tasked with the job of comparing applicability scores and choosing a next rule for execution or strategy to dispatch, i.e., each strategy may have its own rule chooser (engine) or may inherit such a rule chooser from a superclass. Doing so may provide the additional flexibility of allowing part of a distinct strategy to be the rule selection algorithm used. A strategy that is rule based may employ a method for scoring rules that are applicable and then apply them in order of best score to worst. Many such existing methods may be used consistent with the invention.

Rules may also provide the ability to trace how the optimizer's decisions are made, by identifying the rules as they are applied. In certain embodiments, an "explain" function may be incorporated to rely upon a series of rule application trace entries to show how the optimizer reached a final plan, including the conditions found to be true and the scores of the rules that were considered. Incorporated into each rule may be the ability to display that rule's set of conditions and actions in a textual form. Then, when the optimizer is run while a request for tracing information is active, this text may be dumped to a "trace buffer," which can be saved or displayed, and which when complete will show a comprehensive list of the decisions made by the optimizer.

Structured Optimizer Design Using Optimizer Framework

Through the use of the aforementioned framework of strategies, rules, conditions and actions, practically any optimizer functionality may be represented in a structured and easily modified manner. As mentioned above, strategies may be used as the fundamental (active) entities in an optimizer that make decisions, perform modifications of the query representation, and complete the assignment of an access plan for each node. Strategies are responsible for determining the overall algorithm to use to find the best solution, for applying particular optimization algorithms to the query, for determining the best access method for each table, etc.

Much as with many object-oriented environments, strategies may be configured as needed to partition the functionality of the optimizer into various structured modules. When strategies are implemented as objects, as described below, strategies can inherit from other strategies, thus permitting specific strategies to inherit more general functionality from more general strategies. Many of the other advantages inherent in object oriented design also contribute to the flexible and rapid development of an optimizer using the aforementioned framework.

Any particular strategy may be configured to represent high or low-level sub optimizations to attempt, or specific access plan steps to generate. A strategy may choose rules and execute them, the result of which may be the dispatch of other sub-strategies.

Multiple strategies may be configured to work together hierarchically to perform some optimization or some other work. Through the application of rules that reference the current state of a query, higher level strategies may dispatch more specific strategies, a process that can continue to any level. Strategies or actions along the way can do some work on the query and/or decide which sub strategies are to be dispatched. Strategies can operate serially or in parallel, and may operate on different portions of a query, or may be "competing" to provide alternative solutions to a particular portion of a query.

One specific type of strategy that may be utilized is referred to herein as a modifier strategy, which is principally used to make changes to a query representation. A modifier strategy may assign access plan information to part of the query, or rewrite part of the query into an equivalent but faster running form. For example, a modifier strategy might incorporate a query rewrite strategy such as predicate pushdown to modify a query by changing the place at which a predicate is evaluated.

Another specific type of strategy is a meta strategy, which is used to direct and orchestrate the work of other strategies. Typically, a meta strategy does not modify an internal query representation, though through some rules such a strategy may need to interrogate for specific information and dispatch other strategies that perform the actual modification. For example, assuming that both Greedy Join and Dynamic Programming exist as modifier strategies, a meta strategy might be configured to determine which of those strategies should be used to pick a join order.

Typically, a meta strategy incorporates a repertoire of "sub-strategies" that focus on those optimizations that are related to the meta strategy's "area of expertise." These terms are typically left vague, since the goal of the framework is to be useful in many different situations and environments. More specific meta strategies may inherit from a more general strategy to apply a repertoire of sub-strategies to deal with more specific areas of expertise. Through appropriate configuration and selection of meta and modifier strategies, the overall search space for an optimizer can be effectively defined.

Cooperatively, the strategies form a set of rules that will be executed to optimize each query provided to the optimizer. This set of rules may further be dynamic; i.e., performing a particular action in one rule may effectively add or take rules away from the overall set, or even modify existing rules.

Using the aforementioned framework, new modifier strategies can be added to an optimizer design, or existing strategies may be modified with minimal changes outside the work required to implement the algorithms. One particular advantage that often results from there herein-described methodology is an avoidance of the typical "cascading of changes" that occurs in conventional optimizers, where the operation of existing algorithms are inherently changed to account for the characteristics of a new algorithm. This is especially valuable in practice considering that new optimizer algorithms and techniques are constantly being developed and refined. Using the herein-described framework, such algorithms may often be added to an optimizer's "toolbox" with minimal disruption. The optimizer developer may use the herein-described framework to build a flexible rule-based design, with each algorithm qualified by conditions that specify the situations under which each algorithm works best. Put another way, programming such an optimizer is often simply a matter of building new modifier strategies that implement optimization algorithms and creating, weighting, and placing the rules that dispatch them.

While an optimizer framework may be developed to incorporate only modifier strategies, or only modifier and meta strategies, it may also be desirable to incorporate other types of strategies into a framework. For example, it may be desirable to incorporate a rule builder strategy that dynamically builds a set of rules for each query. Doing so may provide a performance advantage, as the effective search space may be considerably narrowed up front, and the set of rules tailored to avoid testing for certain conditions, or instantiating certain strategies, when it can be determined that such tests and instances will not apply to the particular query currently being worked on.

To implement a rule builder strategy, it may be desirable to construct a meta strategy with one rule, which is unconditional: perform an action that builds a set of applicable rules. When the meta strategy is dispatched, the one and only rule is executed, which causes dynamic checks to be made to determine which new rules to construct. In the alternative, a separate strategy may be dispatched that modifies the meta strategy to incorporate a new set of rules.

Yet another type of strategy that may be useful may incorporate monitoring functionality to monitor how well a particular query optimization (or portion thereof) operates and/or to modify another strategy to work in a different manner on subsequent query optimizations.

It will be appreciated that due to the flexibility and extensibility of the aforementioned optimizer framework, a wide variety of strategies and strategy types may be envisioned, incorporating practically any knowledge used in query optimization, and incorporating practically any optimization functionality conventionally used in query optimization. Moreover, given that query optimization in general, and the implementation of specific query optimization techniques, are well known in the art, the implementation of a query optimizer using the aforementioned optimizer framework would be well within the abilities of one of ordinary skill in the art having the benefit of the instant disclosure.

Object-Oriented Optimizer Framework

Figure 4:
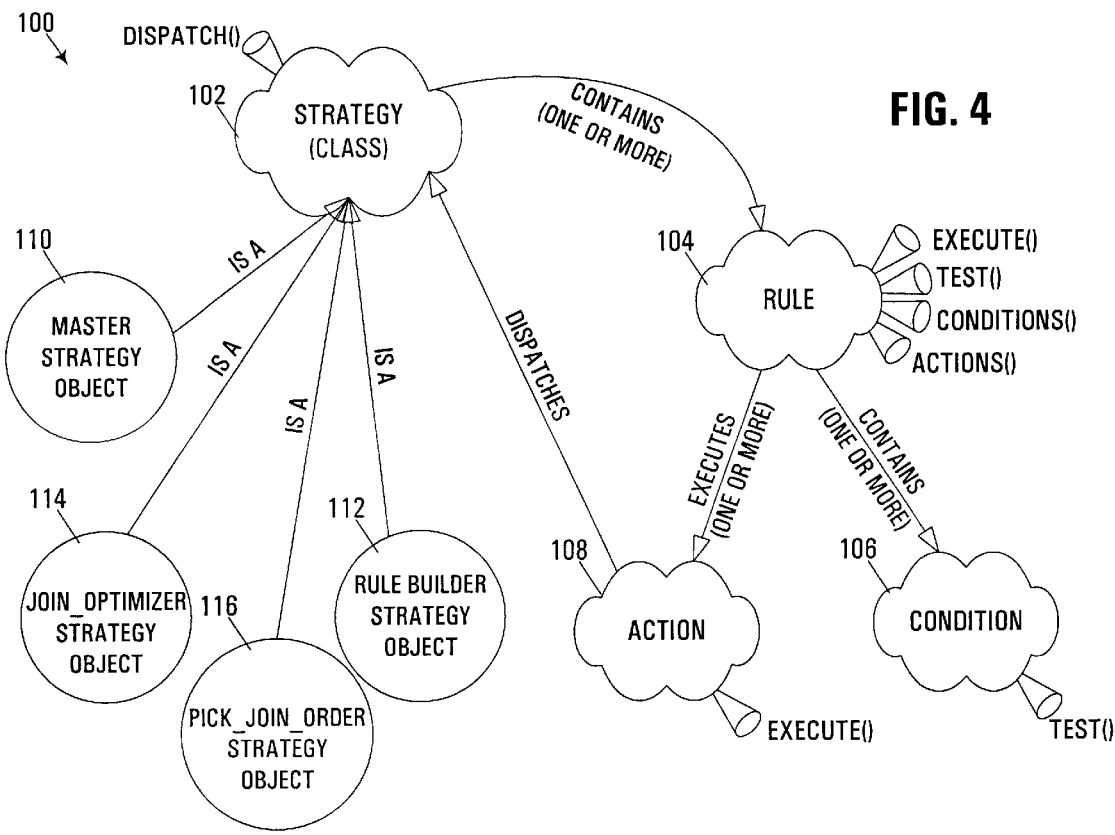
FIG. 4 is an object diagram illustrating one exemplary implementation of the optimizer framework of FIG. 3 in an object-oriented environment.

FIG. 4 next illustrates an object diagram of an exemplary object-oriented implementation of an optimizer framework 100 consistent with the invention. Framework 100 includes a strategy class 102, including a dispatch( ) method capable of being invoked to initiate the operation of a strategy object based on class 102. Strategy class 102 contains one or more rule objects based upon a rule class 104, which in turn has one or more conditions (based on a condition class 106) and executes one or more actions (based on an action class 108). Each rule based upon class 104 includes an execute( ) method used to initiate execution of an action object (which correspondingly has an execute( ) method provided thereby), a test( ) method used to initiate the test of a condition object (which correspondingly has a test( ) method provided thereby), and conditions( ) and actions( ) methods used to retrieve the lists of conditions and actions, respectively, referenced by a rule.

Any number of strategies may be defined in framework 100, as discussed above. FIG. 4 illustrates by way of example several strategy objects, including a MASTER strategy object 110 (which functions as a meta strategy), a RULE_BUILDER strategy object 112, a JOIN_OPTIMIZER strategy object 114, and a PICK_JOIN_ORDER strategy object 116, the use and configuration of which will be described in greater detail below. It will be appreciated, however, that a vast number of additional types of strategies may be incorporated into an optimizer design consistent with the invention.

Figure 5:
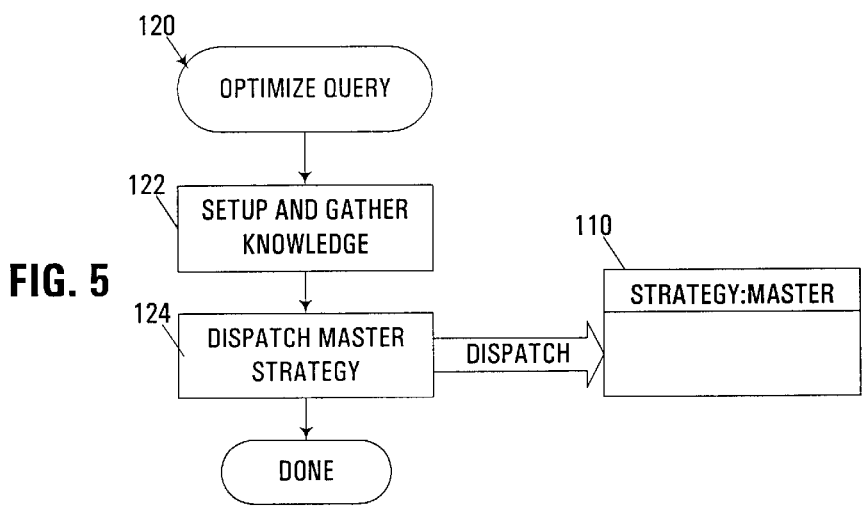
FIG. 5 is a flowchart illustrating the program flow of an optimize query routine executed by an exemplary optimizer component utilizing the optimizer framework of FIG. 4, when optimizing a database query in a manner consistent with the invention.

FIG. 5 next illustrates an optimize query routine 120, executed by a query optimizer component of a database management system to initiate the optimization of a query using the aforementioned optimizer framework. Routine 120 is typically coded in hard code (i.e., not within any particular strategy), and typically performs a certain degree of knowledge gathering and initial setup to prepare the optimizer component for processing of a parsed statement representation of a database query, as shown in block 122. Next, to initiate processing of the query, routine 120 dispatches master strategy 110, as shown in block 124. Dispatch of the master strategy typically incorporates the invocation of the dispatch( ) method on the master strategy object. In addition, in some embodiments, dispatch of the master strategy may incorporate instantiation of a new master strategy object from the strategy class or a subclass thereof.

Once dispatch of the master strategy occurs, an optimized query is thereafter generated under the direction of the master strategy, and routine 120 is complete. It will be appreciated that the optimized query output by a query optimizer constructed using the aforementioned optimizer framework is generally configured as an access or execution for use in executing a query on a database engine. As such, a query optimizer consistent with the invention may be configured to output practically any access plan as appropriate for use in the particular database engine with which the optimizer is used.

FIGS. 6–10 next illustrate an exemplary configuration of strategies suitable for optimizing a database query in a manner consistent with the invention. In the discussion hereinafter, the following SQL database query (shown at 130 in FIG. 6) is used by way of example:

SELECT F1.FIELD_A, F2.FIELD_B
FROM F1 INNER JOIN F2
ONF1.FIELD_C=F2.FIELD_D

The aforementioned database query performs an inner join operation, selecting rows from a pair of files (or tables) F1 and F2 where Field_C of file F1 is equal to Field_C of file F2. From these selected rows, the database query retrieves as its result set Field_A from file F1 and Field_B from file F2.

Figure 6:
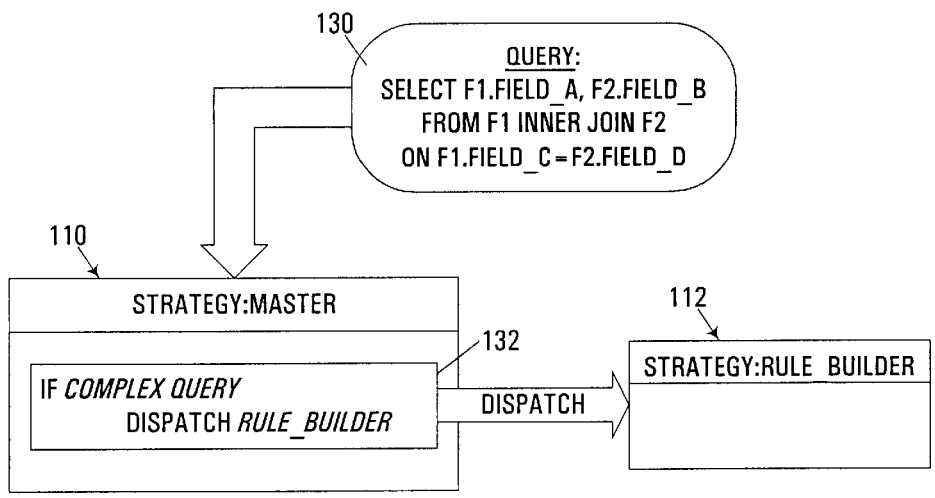
FIG. 6 is a block diagram illustrating the dynamic dispatch of a Rule__Builder strategy by a Master strategy during optimization of an exemplary database query by the optimize query routine of FIG. 5.

An exemplary initial configuration for master strategy 110 is illustrated in FIG. 6, including a single rule 132 with a condition that determines initially whether the query presented to the optimizer qualifies as a "complex query". A complex query, for example, may be considered to be a query that has multiple selects, multiple files or tables, multiple sub-queries, etc. In this regard, if a query is not considered complex, no optimization of the query may be required.

If the query is considered complex, rule 132 has an action that dispatches a RULE_BUILDER strategy 112. In the illustrated embodiment, strategy 112 serves to construct one or more rules and/or strategies suitable for processing the complex query. Strategy 112, for example, may include a sequence of rules that test for certain aspects of the database query, such as the type of query (i.e., inner join, outer join, etc.), the number of files or tables involved, the number of selects, etc. In the alternative, strategy 112 may be hard coded in nature.

Figure 7:
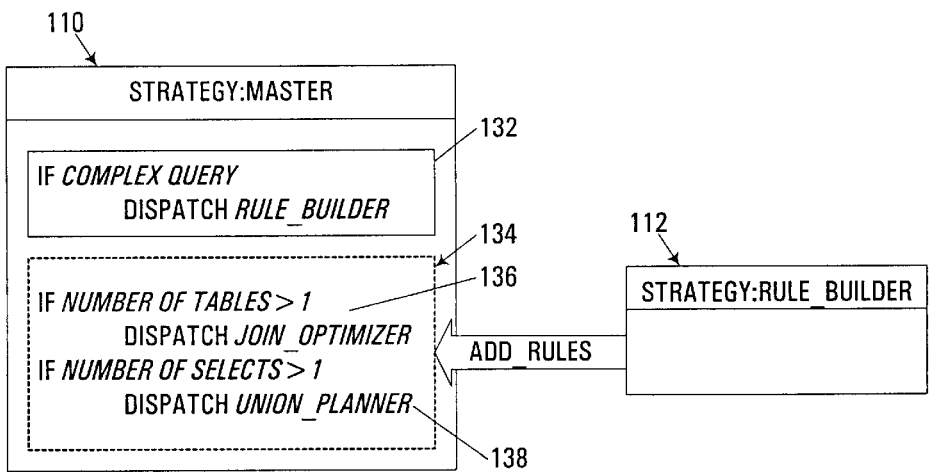
FIG. 7 is a block diagram illustrating the addition of rules to the Master Strategy after dispatching the Rule__Builder strategy in FIG. 6.

In response to detecting certain query aspects, one or more rules are constructed and added to master strategy 110. For example, as shown in FIG. 7, RULE_BUILDER strategy 112 adds a plurality of customized rules 134 to master strategy 110, including rules 136 and 138, which are tailored to specifically customize the exemplary database query presented herein. In the alternative, master strategy may incorporate rules 134 initially, rather than having such rules dynamically constructed by a rule builder strategy. However, given the multitude of possible queries and optimizations that may be performed thereon, it is generally desirable to utilize a separate rule builder strategy that dynamically adds only those rules that are pertinent to a particular database query.

Figure 8:
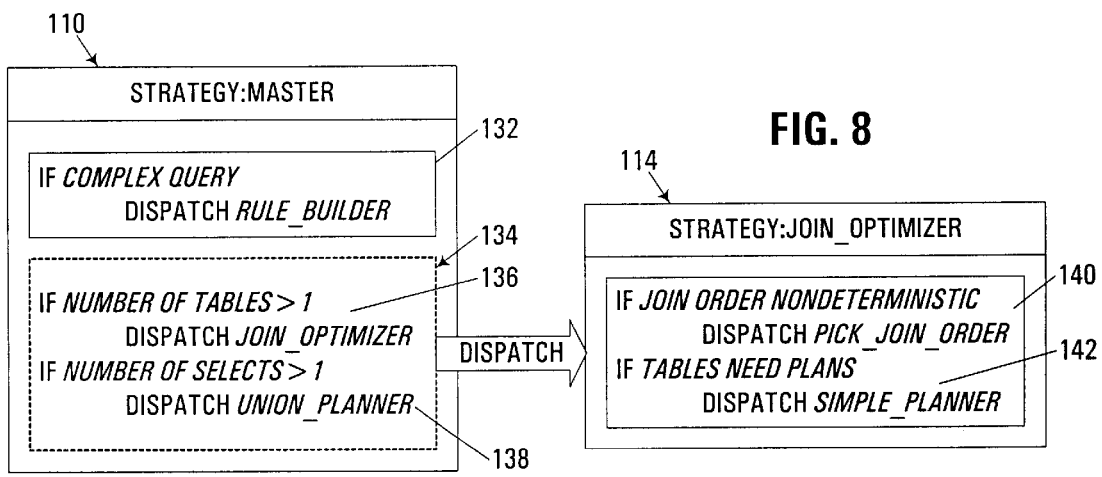
FIG. 8 is a block diagram illustrating the dynamic dispatch of a Join__Optimizer strategy by the Master strategy in response to processing a rule added to the Master strategy by the Rule__Builder strategy in FIG. 7.

Once rules 134 have been added to master strategy 110, those rules are then sequentially processed by the master strategy. As such, rule 136 is next processed, which in the illustrated embodiment includes a condition that tests the number of files or tables with which the database query is associated, and which performs an action of dispatching JOIN_OPTIMIZER strategy 114 if the number of files or tables is greater than one. In the exemplary database query, two files or tables F1 and F2 are affected by the query, so processing of rule 136 results in the dispatch of strategy 114, as shown in FIG. 8.

Strategy 114 includes a pair of rules 140, 142, the first of which tests the condition of whether the join order for the query is nondeterministic, and which performs the action of dispatching PICK_JOIN_ORDER strategy 116 if the condition is met. A nondeterministic join does not have any restrictions on join order, and thus permits the order in which the files or tables are searched to be reordered if doing so would provide improved performance due to reduced fanout. As such, assuming for the purposes of the example, that no restrictions are placed on reordering the join order for the exemplary query, rule 140 dispatches strategy 116, as shown in FIG. 9.

Strategy 116 as shown includes two rules 144, 146, which together result in the selection of one of two join order selection algorithms for selection of an appropriate join order for the example database query. Rule 144 has a condition that determines whether the number of files or tables is "large" (e.g., greater than a certain number), with the resulting action being that of dispatching a DO_GREEDY strategy. Rule 146 has a condition that determines whether the number of files or tables is "small" (e.g., less than or equal to a certain number), with the resulting action being that of dispatching a DYNAMIC_PROGRAMMING strategy. As is well known in the art, dynamic programming and greedy algorithms are alternative algorithms for selecting join order during query optimization. The greedy algorithm is more efficient than the dynamic programming algorithm for large numbers of files or tables, and as such, rules 144 and 146 select one of these algorithms based upon the number of files or tables with which the query is associated.

Figure 9:
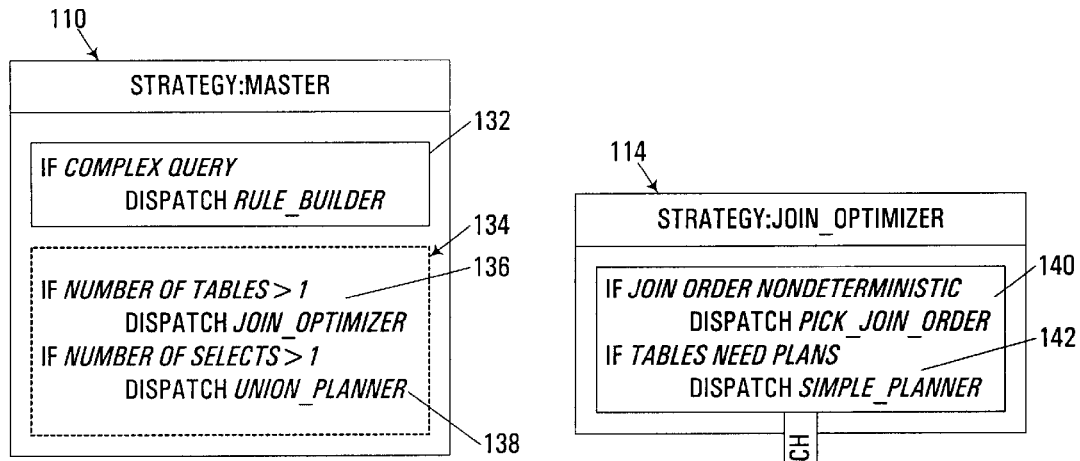
FIG. 9 is a block diagram illustrating the dynamic dispatch of a Pick__Join__Order strategy by the Join__Optimizer strategy in response to processing a rule in the Join__Optimizer strategy dispatched in FIG. 8.

While the DYNAMIC_PROGRAMMING and DO_GREEDY strategies are not shown separately in FIG. 9, it will be appreciated that each strategy may be implemented using rules and/or hard coded program code to implement the well known dynamic programming and greedy algorithms. As such, strategy 116 results in the selection of an optimal join order using one of the aforementioned order selection algorithms.

Figure 10:
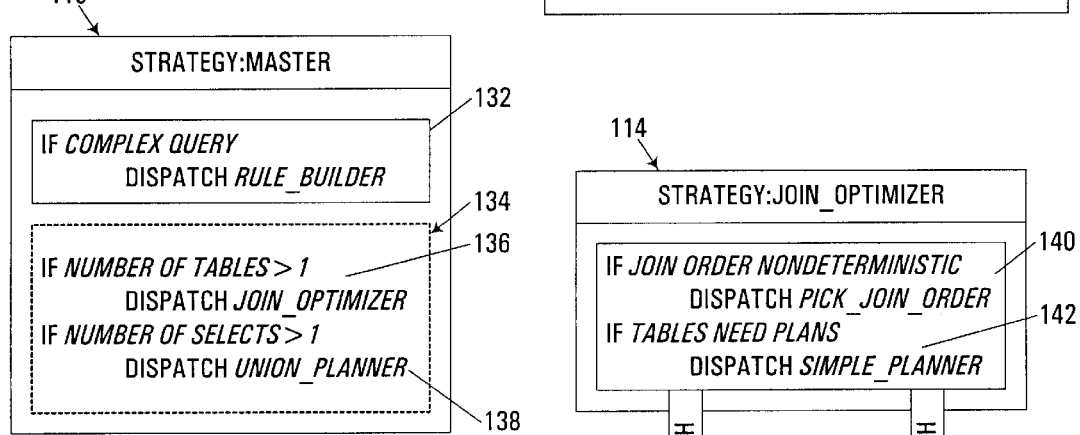
FIG. 10 is a block diagram illustrating the dynamic dispatch of a Simple__Planner strategy to assign access plans to two nodes in the above exemplary database query subsequent to dispatching the Pick__Join__Order strategy in FIG. 9.

Next, as shown in FIG. 10, once rule 140 has initiated the selection of a join order, rule 142 is executed to determine whether any tables or files remain unprocessed, and thus require access plans therefor. Execution of rule 142 functions as a loop that executes until access plans have been selected for each of files F1 and F2, with a SIMPLE_PLANNER strategy dispatched for each file. As shown in FIG. 10, separate strategy objects 148, 150 may include suitable functionality for assigning the appropriate access plans for each of files F1 and F2, as shown in blocks 152, 154. Such objects may be dispatched serially or in parallel. In the alternative, a single SIMPLE_PLANNER object may be sequentially dispatched to assign the appropriate access plans to each of files F1 and F2. The SIMPLE_PLANNER strategy may, for example, select an optimal access method such as table scan or index probe, using similar access method selection algorithms as are known in the optimization art, e.g., based upon the available indexes, the estimated number of matching rows, etc.

It should be appreciated that once the access plans have been assigned by the SIMPLE_PLANNER strategy, JOIN_OPTIMIZER strategy 116 will have processed all of its rules, whereby control may return to master strategy 110 to process its next rule, rule 138. In the exemplary embodiment, rule 138 has a condition that tests whether the number of selects in the query is greater than one, and an action that dispatches a UNION_PLANNER strategy to select an optimal union algorithm. In the exemplary database query, however, only one select is performed, so in this example, the condition of rule 138 is not met, so the UNION_PLANNER strategy is not performed. Upon completion of rule 138, optimization of the example query is complete, and control may return to optimize query routine 120 of FIG. 5.

Figure 11:
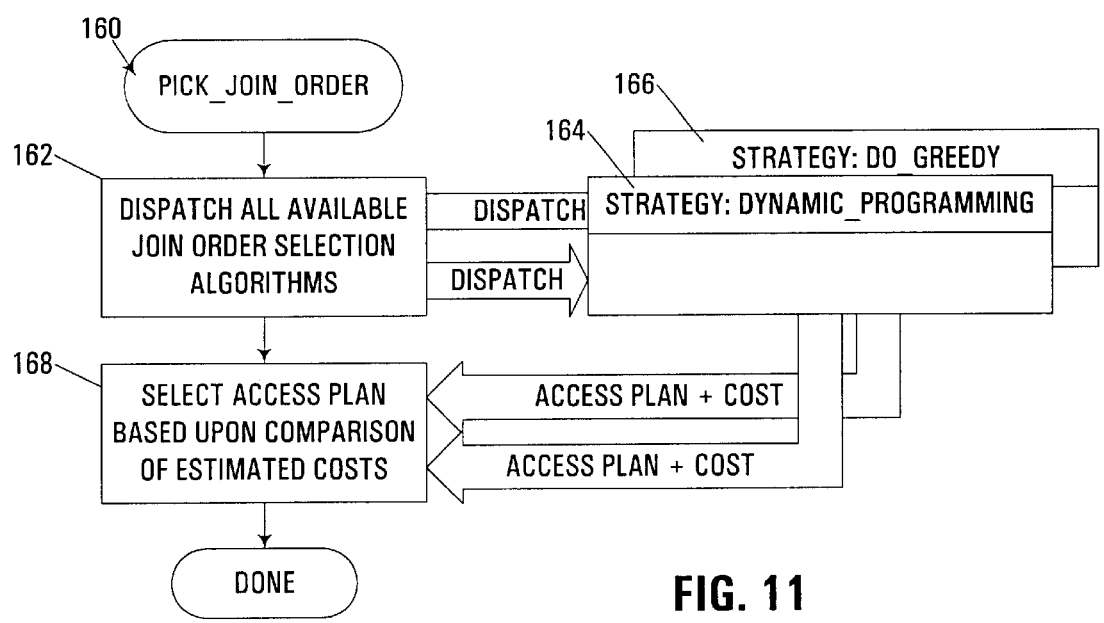
FIG. 11 is a flowchart illustrating the program flow of an alternate implementation of the Pick__Join__Order strategy of FIG. 9.

As discussed above, in some environments, it may be desirable to dispatch multiple "competing" strategies and select the optimal results therefrom based upon the comparative performance of each strategy. FIG. 11, for example, illustrates a routine 160 for an alternate PICK_JOIN_ORDER strategy to strategy 116 of FIG. 9. Routine 160, instead of selecting one join order algorithm, dispatches (either serially or in parallel) both a DYNAMIC_PROGRAMMING strategy 164 and a DO_GREEDY strategy 166 to attempt to pick a join order for the example database query. Each strategy 164, 166 is desirably configured to output both an access plan and a cost, representative of the estimated cost of the algorithm during execution of the database query. Such information is provided to routine 160, which in block 168 selects the most appropriate access plan from those returned by strategies 164, 166 based upon the estimated costs returned thereby. Upon completion of routine 160, an optimum access plan for selecting join order is obtained.

As also discussed above, in some environments, it may be desirable to statically or dynamically modify certain rules or strategies to improve the performance of the query optimizer. As an example, in PICK_JOIN_ORDER strategy 116 of FIG. 9, the selection of which join order selection algorithm to use is based upon the number of tables or files accessed by the query. If, for example, the strategy was configured to select the dynamic programming algorithm when the number of files is three or more, and it was later determined (either by a programmer or automatically by a monitor strategy) that a more optimal rule is to perform dynamic programming only when the number of files is four or more, it can be appreciated that modification of strategy 116 to accommodate this change requires only a relatively straightforward modification of rules 144 and 146. This is in contrast to conventional optimizers where implementation of such a modification would most likely require substantial recoding and recompilation of the optimizer. As such, the dynamic nature of the aforementioned optimizer framework may be used to substantially simplify the refinement of the "intelligence" of an optimizer consistent with the invention.

It will be appreciated that the configuration of strategies for handling different types of queries may vary considerably in different applications, as such, the configuration of the strategies for the exemplary database query above is provided merely for illustrative purposes. Moreover, it will be appreciated that a wide variety of optimization algorithms are known in the art, that new algorithms are constantly being developed and existing algorithms refined, and that practically any of such algorithms may be incorporated into an optimizer framework consistent with the invention. The implementation of such algorithms into strategies, rules, actions, conditions and additional hard coded program code would be well within the abilities of one of ordinary skill in the art having the benefit of the instant disclosure.

Various modifications may be made to the illustrated embodiments without departing from the spirit and scope of the invention. Therefore, the invention lies in the claims hereinafter appended.

What is claimed is:

1. An apparatus, comprising:
  (a) a memory;
  (b) a plurality of active strategy entities resident in the memory, the plurality of active strategy entities including:
    (i) first and second active strategy entities, each configured to generate at least a portion of an execution plan; and
    (ii) a third active strategy entity configured to dynamically evaluate at least one condition associated therewith, and in response thereto, to dynamically dispatch at least one of the first and second active strategy entities; and
  (c) program code configured to generate an optimized execution plan for a database query by initiating the dynamic dispatch of the third active strategy entity, wherein the third active strategy entity is configured to select only one of the first and second active strategy entities for dynamic dispatch based upon the dynamic evaluation of the condition.

2. The apparatus of claim 1, wherein at least one of the plurality of active strategy entities has a rule associated therewith, the rule including a condition and an action to be performed in response to a determination that the condition has been met.

3. The apparatus of claim 1, wherein the condition evaluates knowledge selected from the group consisting of implementation algorithm applicability information, access method applicability information, query content information, statistical performance information, environmental information, platform capability information, and combinations thereof.

4. The apparatus of claim 1, wherein at least one of the plurality of active strategy entities is configured to apply an optimization algorithm to at least a portion of the database query.

5. An apparatus, comprising:
  (a) a memory;
  (b) a plurality of active strategy entities resident in the memory, the plurality of active strategy entities including:
    (i) first and second active strategy entities, each configured to generate at least a portion of an execution plan; and
    (ii) a third active strategy entity configured to dynamically evaluate at least one condition associated therewith, and in response thereto, to dynamically dispatch at least one of the first and second active strategy entities; and
  (c) program code configured to generate an optimized execution plan for a database query by initiating the dynamic dispatch of the third active strategy entity, wherein at least one of the plurality of active strategy entities has a rule associated therewith, the rule including a condition and an action to be performed in response to a determination that the condition has been met, and wherein at least one of the plurality of active strategy entities is configured to build a plurality of rules for inclusion in another active strategy entity.

6. An apparatus, comprising:
  (a) a memory;
  (b) a plurality of active strategy entities resident in the memory, the plurality of active strategy entities including:
    (i) first and second active strategy entities, each configured to generate at least a portion of an execution plan; and
    (ii) a third active strategy entity configured to dynamically evaluate at least one condition associated therewith, and in response thereto, to dynamically dispatch at least one of the first and second active strategy entities; and
  (c) program code configured to generate an optimized execution plan for a database query by initiating the dynamic dispatch of the third active strategy entity, wherein at least one of the plurality of active strategy entities has a rule associated therewith, the rule including a condition and an action to be performed in response to a determination that the condition has been met, and wherein at least one of the plurality of active strategy entities is configured to dynamically modify a rule with which another active strategy entity is associated.

7. The apparatus of claim 6, wherein the dynamically modified rule is processed in modified form during generation of the optimized execution plan for the database query.

8. An apparatus, comprising:
  (a) a memory;
  (b) a plurality of active strategy entities resident in the memory, the plurality of active strategy entities including:
    (i) first and second active strategy entities, each configured to generate at least a portion of an execution plan; and
    (ii) a third active strategy entity configured to dynamically evaluate at least one condition associated therewith, and in response thereto, to dynamically dispatch at least one of the first and second active strategy entities; and
  (c) program code configured to generate an optimized execution plan for a database query by initiating the dynamic dispatch of the third active strategy entity, wherein the third active strategy entity is configured to dynamically dispatch the first and second active strategy entities to execute in parallel to generate alternative portions of an execution plan, and to select one of the alternative portions for inclusion in the optimized execution plan.

9. An apparatus, comprising:
  (a) a memory;
  (b) a plurality of active strategy entities resident in the memory, the plurality of active strategy entities including:

(i) first and second active strategy entities, each configured to generate at least a portion of an execution plan; and (ii) a third active strategy entity configured to dynamically evaluate at least one condition associated therewith, and in response thereto, to dynamically dispatch at least one of the first and second active strategy entities; and (c) program code configured to generate an optimized execution elan for a database query by initiating the dynamic dispatch of the third active strategy entity, wherein the third active strategy entity is configured to dynamically dispatch the first and second active strategy entities to generate different portions of an execution plan.

10. A method of optimizing a database query, the method comprising:

(a) dynamically evaluating a condition, and in response thereto dynamically dispatching at least one of first and second active strategy entities among a plurality of active strategy entities, using a third active strategy entity among the plurality of active strategy entities, wherein each of the first and second active strategy entities is configured to generate at least a portion of an execution plan; and (b) generating at least a portion of an optimized execution plan for the database query using the at least one of the first and second active strategy entities dynamically dispatched by the third active strategy entity, wherein the third active strategy entity is configured to dynamically dispatch the first and second active strategy entities to generate different portions of an execution plan.

11. The method of claim 10, wherein at least one of the plurality of active strategy entities has a rule associated therewith, the rule including a condition and an action to be performed in response to a determination that the condition has been met.

12. The method of claim 10, wherein the condition evaluates knowledge selected from the group consisting of implementation algorithm applicability information, access method applicability information, query content information, statistical performance information, environmental information, platform capability information, and combinations thereof.

13. The method of claim 10, wherein at least one of the plurality of active strategy entities is configured to apply an optimization algorithm to at least a portion of the database query.

14. A method of optimizing a database query, the method comprising:

(a) dynamically evaluating a condition, and in response thereto dynamically dispatching at least one of first and second active strategy entities among a plurality of active strategy entities, using a third active strategy entity among the plurality of active strategy entities, wherein each of the first and second active strategy entities is configured to generate at least a portion of an execution plan; and (b) generating at least a portion of an optimized execution plan for the database query using the at least one of the first and second active strategy entities dynamically dispatched by the third active strategy entity, wherein at least one of the plurality of active strategy entities has a rule associated therewith, the rule including a condition and an action to be performed in response to a determination that the condition has been met, and wherein at least one of the plurality of active strategy entities is configured to build a plurality of rules for inclusion in another active strategy entity.

15. A method of optimizing a database query, the method comprising:

(a) dynamically evaluating a condition, and in response thereto dynamically dispatching at least one of first and second active strategy entities among a plurality of active strategy entities, using a third active strategy entity among the plurality of active strategy entities, wherein each of the first and second active strategy entities is configured to generate at least a portion of an execution plan; and (b) generating at least a portion of an optimized execution plan for the database query using the at least one of the first and second active strategy entities dynamically dispatched by the third active strategy entity, wherein at least one of the plurality of active strategy entities has a rule associated therewith, the rule including a condition and an action to be performed in response to a determination that the condition has been met, and wherein at least one of the plurality of active strategy entities is configured to dynamically modify a rule with which another active strategy entity is associated.

16. The method of claim 15, wherein the dynamically modified rule is processed in modified form during generation of the optimized execution plan for the database query.

17. A method of optimizing a database query, the method comprising:

(a) dynamically evaluating a condition, and in response thereto dynamically dispatching at least one of first and second active strategy entities among a plurality of active strategy entities, using a third active strategy entity among the plurality of active strategy entities, wherein each of the first and second active strategy entities is configured to generate at least a portion of an execution plan; and (b) generating at least a portion of an optimized execution plan for the database query using the at least one of the first and second active strategy entities dynamically dispatched by the third active strategy entity, wherein the third active strategy entity is configured to dynamically dispatch the first and second active strategy entities to execute in parallel to generate alternative portions of an execution plan, and to select one of the alternative portions for inclusion in the optimized execution plan.

18. A method of optimizing a database query, the method comprising:

(a) dynamically evaluating a condition, and in response thereto dynamically dispatching at least one of first and second active strategy entities among a plurality of active strategy entities, using a third active strategy entity among the plurality of active strategy entities, wherein each of the first and second active strategy entities is configured to generate at least a portion of an execution plan; and (b) generating at least a portion of an optimized execution plan for the database query using the at least one of the first and second active strategy entities dynamically dispatched by the third active strategy entity, wherein the third active strategy entity is configured to select only one of the first and second active strategy entities for dynamic dispatch based upon the dynamic evaluation of the condition.

19. A method of constructing a query optimizer, comprising:
(a) constructing first and second active strategy entities, each configured to generate at least a portion of an execution plan; and
(b) constructing a third active strategy entity configured to dynamically evaluate at least one condition associated therewith, and in response thereto, to dynamically dispatch at least one of the first and second active strategy entities, wherein the third active strategy entity is configured to be dynamically dispatched in association with the generation of an optimized execution plan for a database query by the query optimizer, and wherein the third active strategy entity is configured to perform at least one of:
  (i) dynamically dispatching the first and second active strategy entities to execute in parallel to generate alternative portions of an execution plan, and selecting one of the alternative portions for inclusion in the optimized execution plan;
  (ii) dynamically dispatching the first and second active strategy entities to generate different portions of an execution plan; and
  (iii) selecting only one of the first and second active strategy entities for dynamic dispatch based upon the dynamic evaluation of the condition.

20. A program product, comprising:
(a) a plurality of active strategy entities, the plurality of active strategy entities including:
  (i) first and second active strategy entities, each configured to generate at least a portion of an execution plan; and
  (ii) a third active strategy entity configured to dynamically evaluate at least one condition associated therewith, and in response thereto, to dynamically dispatch at least one of the first and second active strategy entities, the third active strategy entity configured to be dynamically dispatched in association with generation of an optimized execution plan for a database query, and the third active strategy entity configured to perform at least one of:
    (1) dynamically dispatching the first and second active strategy entities to execute in parallel to generate alternative portions of an execution plan, and selecting one of the alternative portions for inclusion in the optimized execution plan;
    (2) dynamically dispatching the first and second active strategy entities to generate different portions of an execution plan; and
    (3) selecting only one of the first and second active strategy entities for dynamic dispatch based upon the dynamic evaluation of the condition; and
(b) a signal bearing medium bearing the plurality of active strategy entities.

21. The program product of claim 20, wherein the signal bearing medium includes at least one of a transmission medium and a recordable medium.

* * * * *